United States Patent
Patton et al.

(10) Patent No.: US 6,683,724 B2
(45) Date of Patent: Jan. 27, 2004

(54) SOLID IMMERSION LENS ARRAY AND METHODS FOR PRODUCING A SOLID IMMERSION LENS ARRAY

(75) Inventors: David L. Patton, Webster, NY (US); John P. Spoonhower, Webster, NY (US); Anne E. Bohan, Pittsford, NY (US); Gustavo R. Paz-Pujalt, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/171,168

(22) Filed: Jun. 13, 2002

(65) Prior Publication Data

US 2003/0231401 A1 Dec. 18, 2003

(51) Int. Cl.⁷ .................. G02B 27/10; G02B 21/26; G02B 21/34; G02B 3/00
(52) U.S. Cl. .................. 359/626; 359/393; 359/396; 359/664
(58) Field of Search .................. 359/626, 656, 359/661, 664, 719, 368, 391, 393, 396, 398; 369/112.23, 112.24, 13.33

(56) References Cited

U.S. PATENT DOCUMENTS

| | | | |
|---|---|---|---|
| 4,806,004 A | * 2/1989 | Wayland | 359/389 |
| 5,155,624 A | 10/1992 | Flagler | 359/510 |
| 5,311,358 A | 5/1994 | Pederson et al. | 359/510 |
| 5,406,421 A | 4/1995 | Kashima et al. | 359/894 |
| 5,672,816 A | * 9/1997 | Park et al. | 73/105 |
| 5,853,363 A | 12/1998 | Vought | 600/121 |
| 5,910,940 A | 6/1999 | Guerra | 369/275.1 |
| 6,024,454 A | 2/2000 | Horan et al. | 359/510 |
| 6,094,413 A | 7/2000 | Guerra | 369/275.1 |
| 6,221,028 B1 | 4/2001 | Lieberman et al. | 600/558 |
| 6,301,055 B1 | 10/2001 | Legrand et al. | 359/642 |

OTHER PUBLICATIONS

"Imaging with Solid Immersion Lenses, Spatial Resolution, and Applications", Qiang Wu, Member, IEEE, Luke P. Ghislain, Member, IEEE, and V. B. Elings, Proceedings of the IEEE, vol. 88, No. 9, Sep. 2000, pp. 1491–1498.

* cited by examiner

Primary Examiner—David N. Spector
(74) Attorney, Agent, or Firm—Frank Pincelli

(57) ABSTRACT

A solid immersion lens device and method of making. A solid immersion lens device is provided having a plurality of solid immersion lenses. The solid immersion lenses are provided in a predetermined pattern and secured so as to cause them to be in a fixed position with respect to each other.

5 Claims, 11 Drawing Sheets

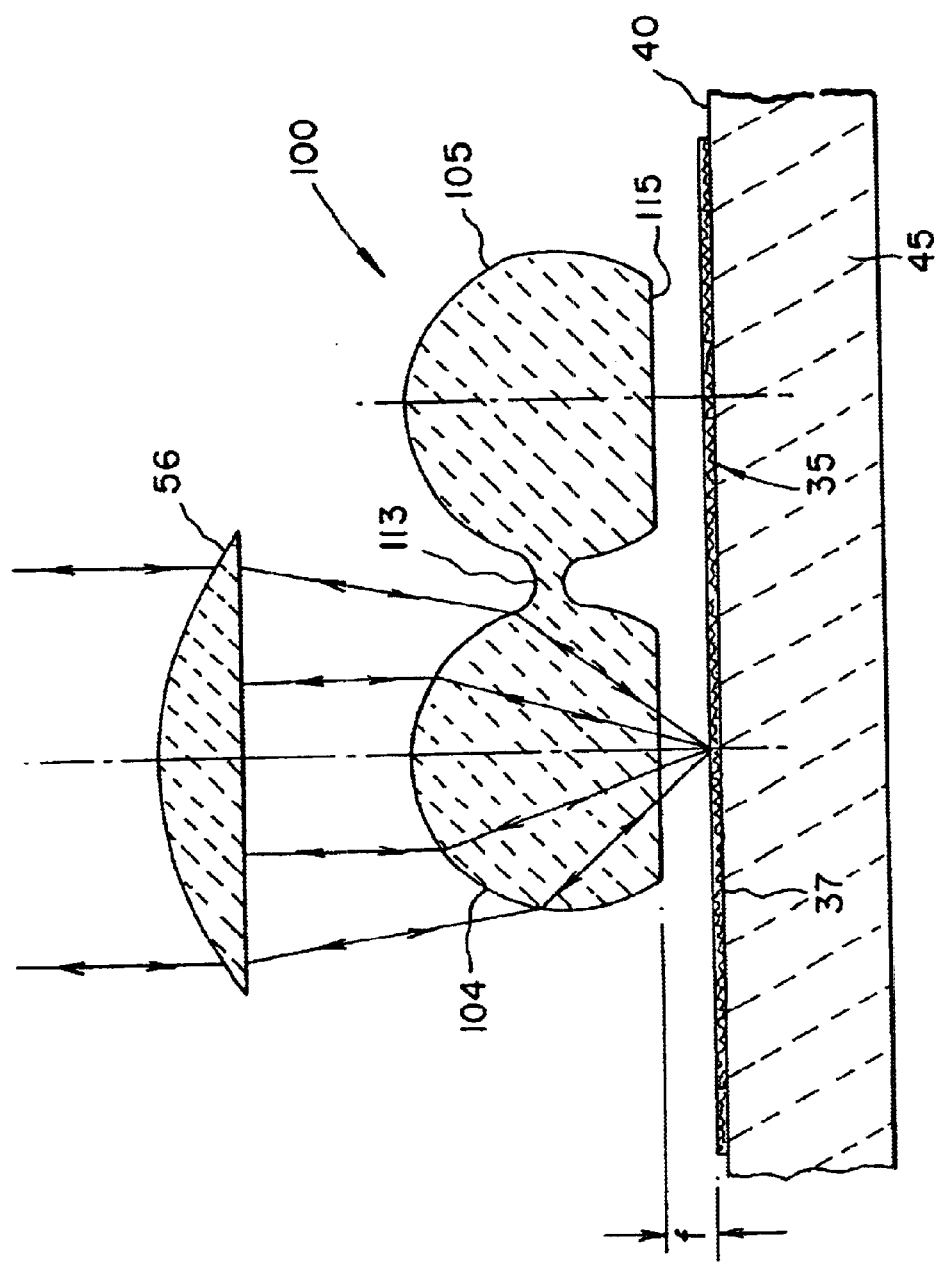

SOLID IMMERSION LENS ARRAY AND METHODS FOR PRODUCING A SOLID IMMERSION LENS ARRAY

CROSS-REFERENCE TO RELATED APPLICATIONS

Reference is made to commonly assigned, co-pending U.S. patent application Ser. No. 10/171,120, filed Jun. 13, 2002 entitled: SOLID IMMERSION LENS ARRAY AND METHODS FOR PRODUCING AND USING SOLID IMMERSION LENS ARRAY WITH FIDUCIAL MARKS in the names of David L. Patton, John P. Spoonhower, Anne E. Bohan, Gustavo R. PasPujalt.

FIELD OF THE INVENTION

This invention relates to an article, system and method used for creating a solid immersion lens array.

BACKGROUND OF THE INVENTION

Recent advances in optics provide for a method of image capture on a length scale much smaller than previously realized. Such near-field optical methods are realized by placing an aperture or a lens in close proximity to the surface of the sample to be imaged. Others (see, for example, the review by Q. Wu, L. Ghislain, and V. B. Elings, Proc. IEEE (2000), 88(9), pg. 1491–1498) have developed means of exposure by the use of the solid immersion lens (SIL).

Typically special methods for positioning control of the aperture or lens are required, as the distance between the optical elements (aperture or lens) and the sample is extremely small. The SIL is positioned within approximately 0.5 micrometer of the target surface by the use of special nano-positioning technology. SIL technology offers the advantage that the lens provides a true image capture capability. For example, features in a real object can be faithfully captured in an image of reduced spatial extent. In the case of the SIL, features can be captured much smaller than the feature size achievable through the use of conventional or classical optics. Such conventional optics are said to be diffraction-limited because the size of the smallest discernable feature in an image is limited by the physical diffraction.

Due to limitations on resolutions obtainable with conventional optical lenses for the application such as microscopy, techniques have been developed to decrease the Rayleigh limit on transverse resolution $\delta$. The Rayleigh limit is given by ($\delta=0.82\lambda/(NA)$ where $\lambda$ is the wavelength and NA is the numerical aperture of the focusing objective (NA=nsin ($\theta$), where n is refractive index of the medium, and $\theta$ is the angle between the outer most rays focusing on the sample and the optical axis).

Coherent light such as laser light can be used to precisely control the wavelength of the illumination $\lambda$. One way to decrease the transverse resolution is to increase the index of refraction of the optical medium, such as by the use of oil-immersion microscopy or use of a solid immersion lens (SIL).

If an SIL is placed in contact with the sample under examination, illumination can be more readily focused on it, and use of the high NA of the system allows efficient collection of the excitation light with high optical transmission efficiency and observation of the sample with very high resolution.

Methods for molding a single solid immersion lens as part of a cover slide are disclosed in U.S. Pat. No. 6,301,055. Illumination of a limited field of view within a single flow channel of sample material is described.

The problem is that a single solid immersion lens mounted on a microscope or attached as an integral part of a slide cover limits the area of view of the sample to a single location, the area directly beneath the solid immersion lens.

Guerra et al. discloses in U.S. Pat. No. 5,910,940 a storage medium having a layer of micro-optical lenses, each lens generating an evanescent field. They further describe in U.S. Pat. No. 6,094,413 optical recording systems that take advantage of near field optics. Though recording of data is possible, the type of lenticular arrays described produce an oblong or otherwise deformed or unsymmetrical pattern unsuitable for microscopy applications.

SUMMARY OF THE INVENTION

In accordance with one aspect of the present invention there is provided a method of viewing a plurality of different sections of a stationary sample using a solid immersion lens array having a plurality of solid immersion lenses and an associated viewing device to be used with the solid immersion lens device; the plurality of a solid immersion lenses in the solid immersion device is provided in a fixed relationship to each other comprising the steps of:

providing the solid immersion lens device with respect to a stationary sample and for viewing of the sample used in the associated viewing device; and causing relative movement between the viewing device and the solid immersion lens device so as to allow viewing of different portions of the samples through the viewing device.

In accordance with another aspect of the present invention there is provided a method of making a solid immersion lens device having a plurality of solid immersion lenses, comprising the steps of:

providing the plurality of solid immersion lenses in a predetermined pattern; and securing the solid immersion lenses in the predetermined pattern so as to cause them to be in a fixed position with respect to each other.

In accordance with yet another aspect of the present invention there is provided a solid immersion lens device comprising:

a plurality of solid immersion lenses; and a body portion in which the plurality of solid immersion lenses are integrally secured, the body portion having a top surface designed to engage a sample for viewing of the sample through the plurality of solid immersion lenses.

In accordance with still another aspect of the present invention there is provided a slide cover having a plurality of solid immersion lenses integrally formed therein, the cover slide having a surface designed to engage a sample for viewing of the sample through the plurality of solid immersion lenses.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIG. 5b illustrates a schematic cross-sectional view of still another solid immersion lens array made in accordance with the present invention;

DETAILED DESCRIPTION OF THE INVENTION

The invention has been described in detail with particular reference to certain preferred embodiments thereof, but it will be understood that variations and modifications can be effected within the scope of the invention.

Figure 1:
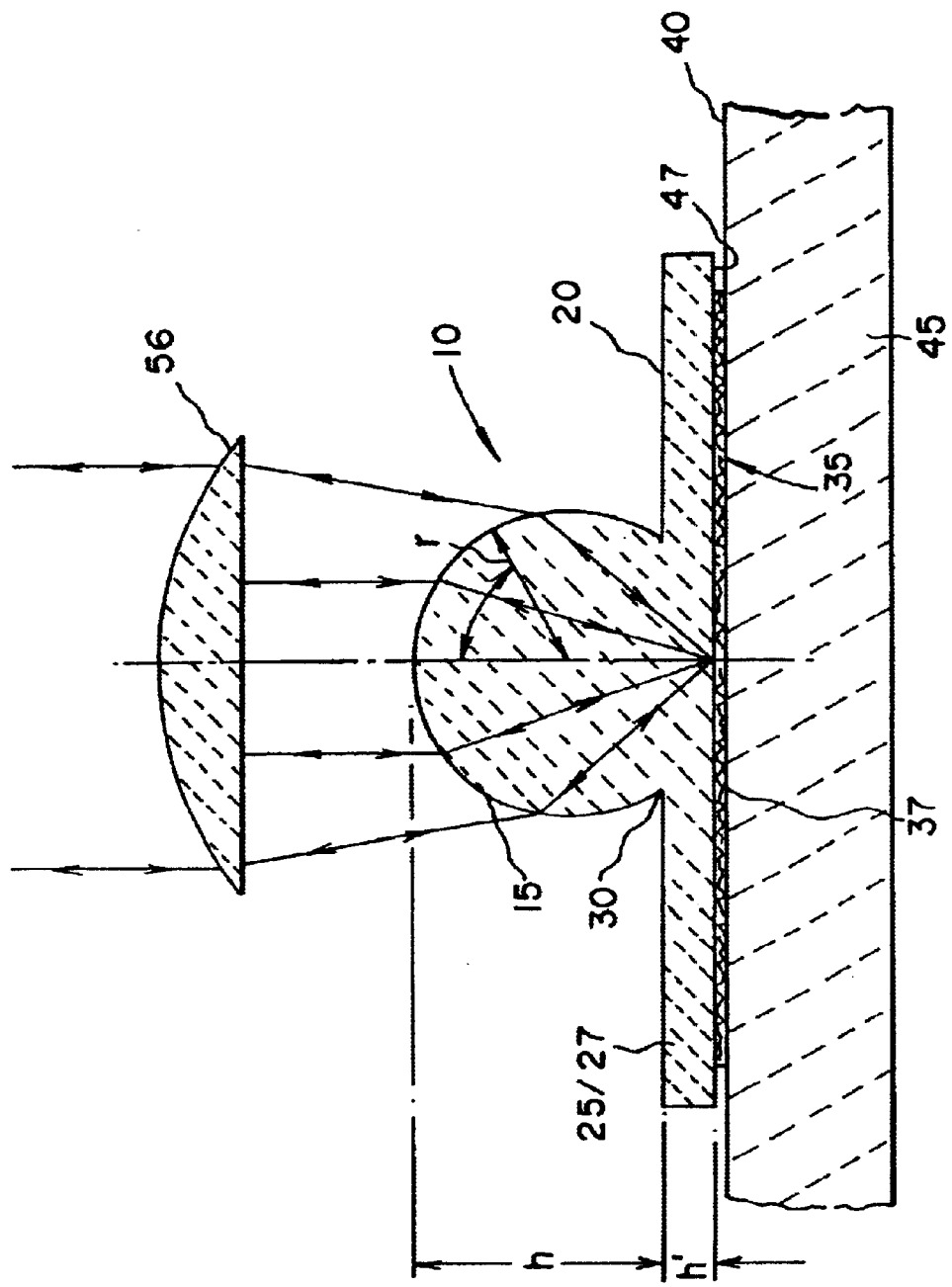
FIG. 1 illustrates a schematic cross-sectional view of a single solid immersion lens structure made in accordance with the present art.

Referring to FIG. 1, there is illustrated a cross-sectional view of a functioning solid immersion lens (SIL) 10 made in accordance with the present art, with indications of the parameters used to describe the structure and operation. A solid immersion lens portion 15 comprises a truncated sphere of radius r and an index of refraction $n_s$. It is disposed at a highest height h above a surface 20 of a body portion 25 so that a boundary margin 30 is formed which is narrower in diameter than the diameter of the lens (2r) portion 15. An observation region 35 is provided at a distance h' from the surface 20. The constraint height h is given by the following relation:

$$r(1-\cos\phi) < h < r + r/n_s$$

where
  r is the radius of the sphere,
  h is the height of the layer,
  $\phi$ is the polar angle from the center of the sphere to the edge of the orifice formed by the undercut margin,
  $n_s$ is the index of refraction of the material, which forms the lens.

The region 35 comprise the area between the top surface 40 of a slide 45 and the surface 47 which is h' below surface 20. The thickness h' above the surface 20 is given by the relation:

$$h' = r + (r/n_s) - h.$$

Samples 37 are placed in the region 35 between the top surface 40 of the slide 45 and the bottom surface 47 of the body portion 25 for observation according to the intended application, such as microscopy, spectroscopy, or cytometry as is well known to those skilled in the art. The body portion 25 can also serve as a slide cover 27. Also shown with the SIL 10 is a collecting/collimating lens 50. The spherical structure and collection configuration admits to construction of lens systems having a numerical aperture higher than unity, which is particularly useful for ultra sensitive spectroscopy, high lateral resolution imaging, and finite depth of field imaging. A method for producing a SIL is disclosed in U.S. Pat. No. 6,301,055.

Figure 2:
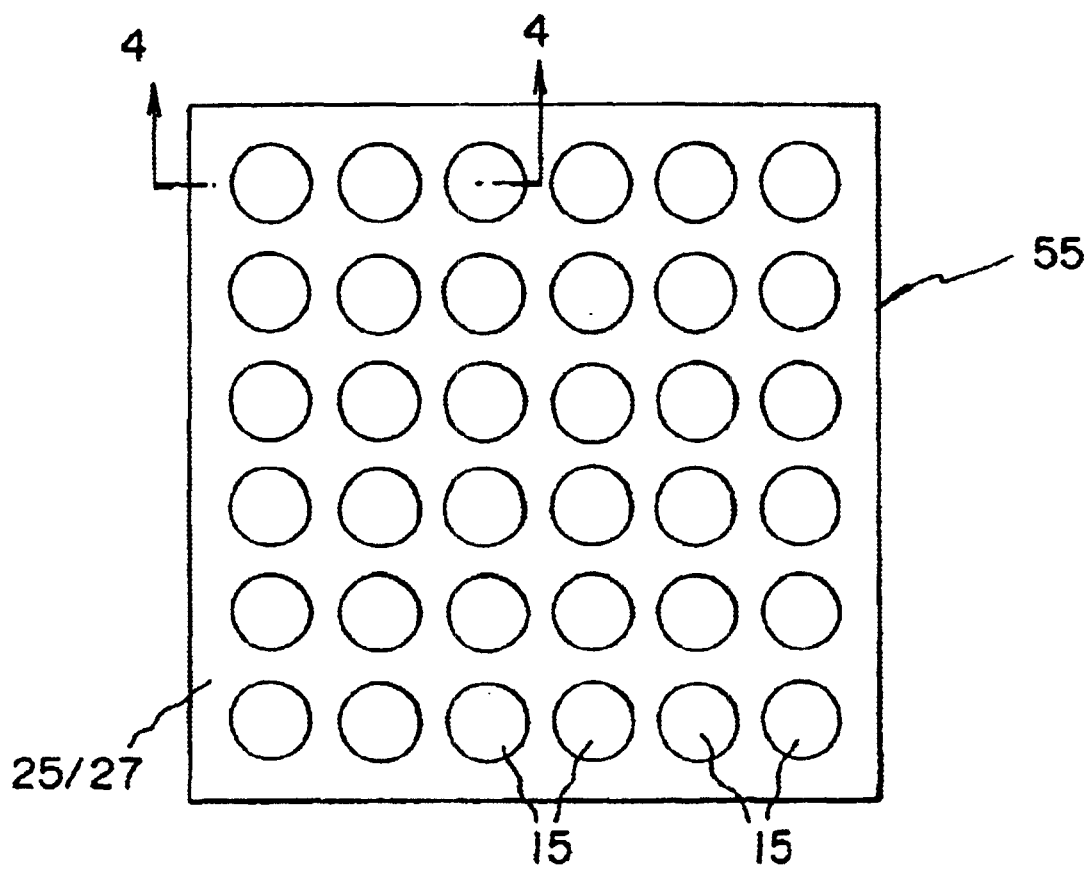
FIG. 2 is a schematic top view of a solid immersion lens array molded as part of a slide cover made in accordance with the present invention.

FIG. 2 illustrates a top view of a solid immersion lens array 55 formed by molding a plurality of solid immersion lens portion 15 of the SIL 10 in a fixed position to one another as part of the slide cover 27 made in accordance with the present invention. As previously discussed in FIG. 1 like numerals indicate like parts and operations. The number and spacing of the solid immersion lens portion 15 can be made to suit the type of sample, which is to be observed. The type of material used to form the solid immersion lens array 55 depends on various parameters. The method disclosed in U.S. Pat. No. 6,301,055 for molding a single SIL lists suitable materials as low temperature of formation polymers, room temperature vulcanization elastomers, low temperature of formation epoxies, polyimides, polycarbonates, and photo resists, or pliant silicone elastomers, Optical performance of the elements of the array is related to the index of refraction $n_s$ of the material forming the lens. The ability of the lens to reduce spot size as noted above, is inversely proportional to $n_s$; therefore it is highly desirable to work with lens materials with large indices of refraction. Commonly used glasses for lens manufacture range in index of refraction from about 1.49 to 1.85. However there are specialty glasses with much higher indices. Plastic materials tend to have low indices of refraction, therefore they are less desirable for SIL manufacture. Thus it is desirable that the index of refraction be equal to or greater than 1.49 for the SIL array. Another consideration in lens material is the ability to withstand the temperatures required for molding and the ability to interact appropriately with the mold material. A method for creating SIL arrays using glass is described in FIG. 5a.

Figure 3:
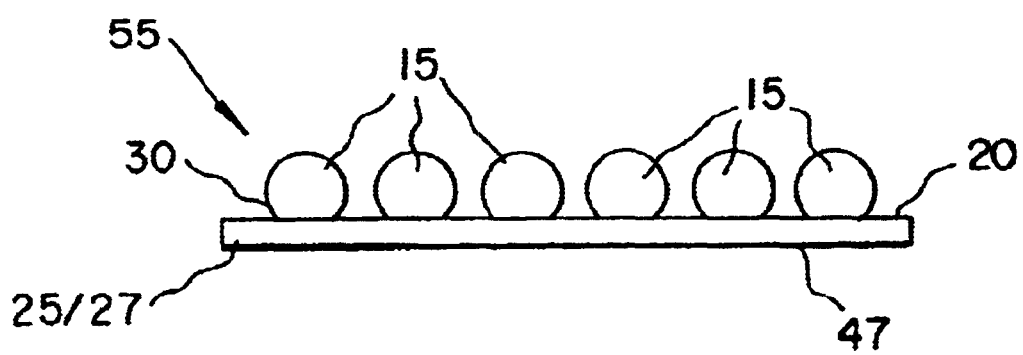
FIG. 3 is a schematic side view of a solid immersion lens array of FIG. 2.

FIG. 3 illustrates a side view of a solid immersion lens array 55 formed by molding the solid immersion lens portion 15 of the SIL 10 as part of the slide cover 27 made in accordance with the present invention. As previously discussed in FIG. 1 like numerals indicate like parts and operations.

Figure 4A:
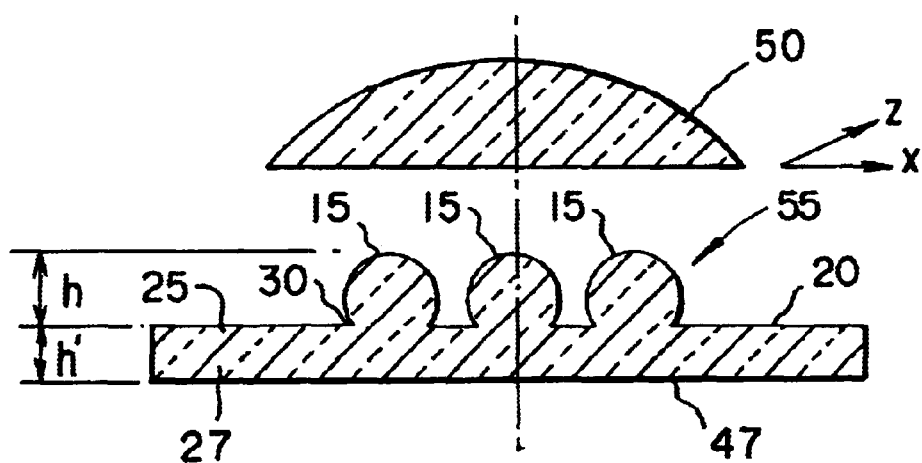
FIGS. 4a, 4b and 4c are schematic cross-sectional views of a solid immersion lens array as taken along line 4—4 of FIG. 2 along with an associated lens.
Figure 4B:
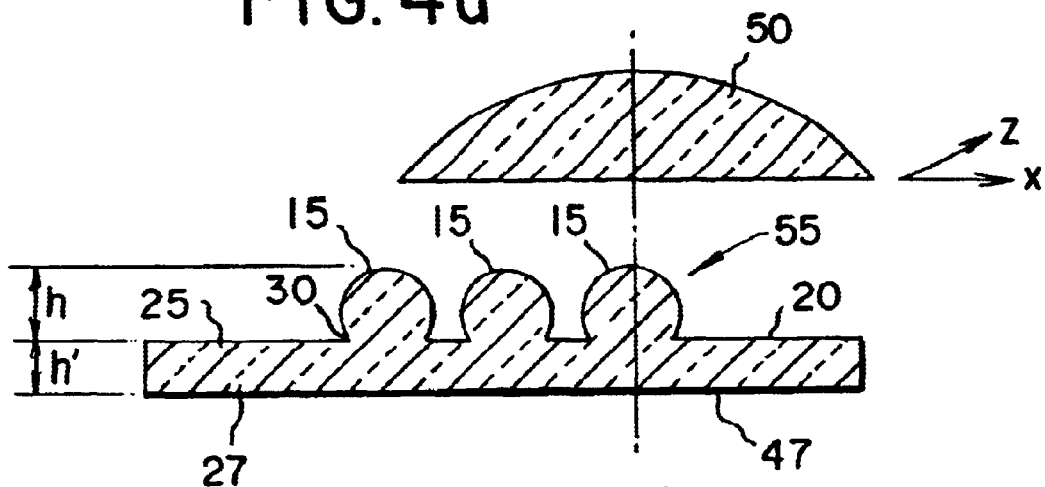
Figure 4C:
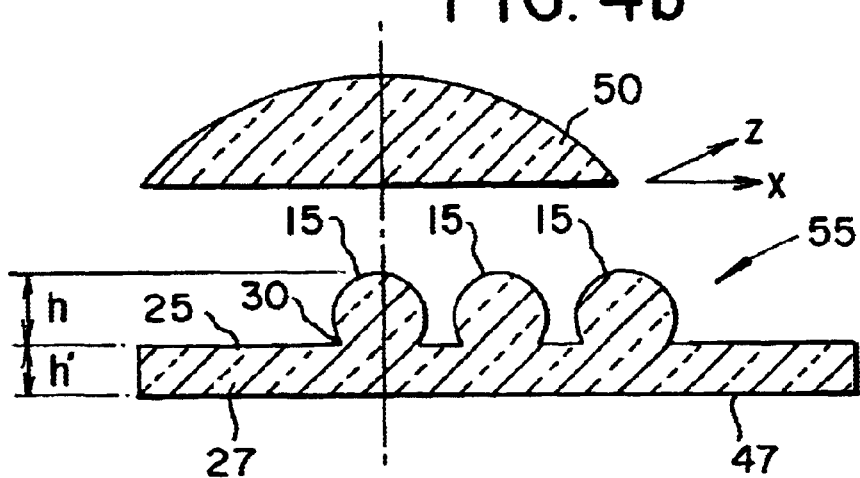

Referring to FIG. 4a, there is illustrated a cross-sectional view of a solid immersion lens array 55 as taken along line 4—4 of FIG. 2 along with an associated lens made in accordance with the present invention. As previously discussed in FIG. 1 like numerals indicate like parts and operations. In the embodiment shown in FIG. 4a, a plurality of solid immersion lens portion 15 are molded with a body portion 25 to form an array as part of a slide cover 27. The solid immersion lens array 55 allows the user to move a magnifying imaging device 60 (see FIG. 12a) collecting/collimating lens 50 in an x and z direction to different positions as shown in FIGS. 4b and 4c to observed different locations of the sample 35 shown in FIG. 1.

The present embodiment describes a plurality of solid immersion lens portions 15 integrally formed with the body portion 25 to form the solid immersion lens array 55. In another embodiment of the present invention referring to FIG. 5a, there is illustrated a cross-sectional view of a solid immersion lens array 100 made in accordance with the present invention. The solid immersion lens array 100 is made by placing glass spheres 101 and 102 in a fixed position with their edges touching. The spheres 101 and 102 are rigidly attached to each other by via a connecting member 110. The connecting member 110 can be formed using an adhesive such as OP29 manufactured by the Dymax Corporation. The SIL array is completed by grinding a flat surface 115 on the connected spheres 101 and 102. forming SIL 104 and SIL 105. The method of grinding a flat on a glass sphere is well known to those skilled in the art. In another method shown in FIG. 5b, the SIL array 100 is created by forming adjacent SIL's 104, 105 and a connecting member 113 as an integral part. In both methods an observation region 35 is provided at critical distance f; as is well known to those skilled in the art. The observation region 35 comprises the area at the distance f, for example 0.5 micrometers below surface 115 of the SIL and the top surface 40 of a slide 45. Samples 37 to be observed are placed in the observation region 35 according to the intended application, such as microscopy, spectroscopy, or cytometry as is well known to those skilled in the art. Alternatively, individual spherical or truncated spherical lens elements may be bonded to the body portion 25 to create the array. In this case, the adhesive must be index matched to both the body and the spherical elements so as to not degrade the imaging properties of the array. The bonding can be performed using an index matching adhesive such as OP29 manufactured by the Dymax Corporation. Spheres made of materials having different indices would allow for different magnifications.

Figure 5A:
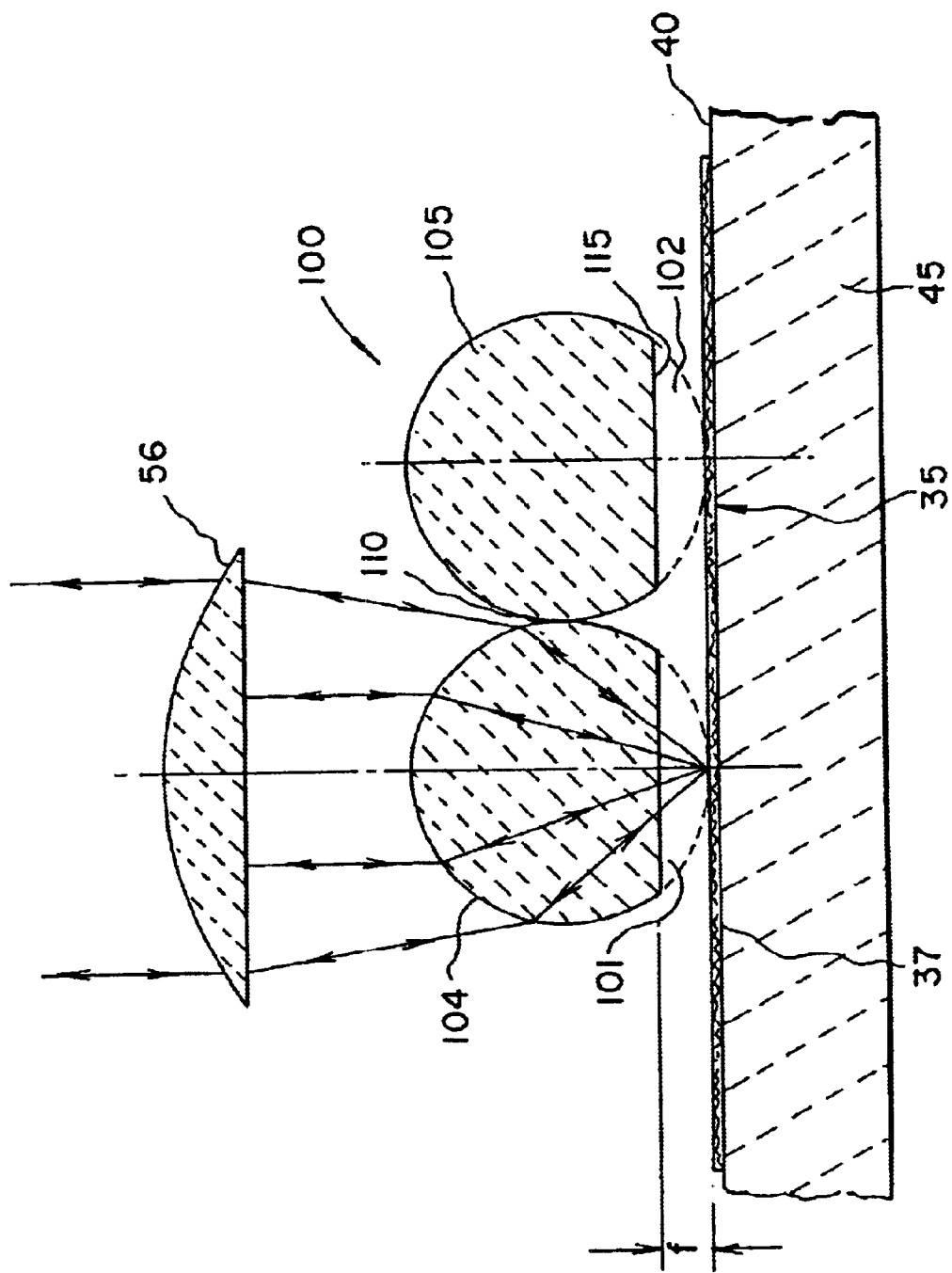
FIG. 5a illustrates a schematic cross-sectional view of yet another solid immersion lens array made in accordance with the present invention.
Figure 6:
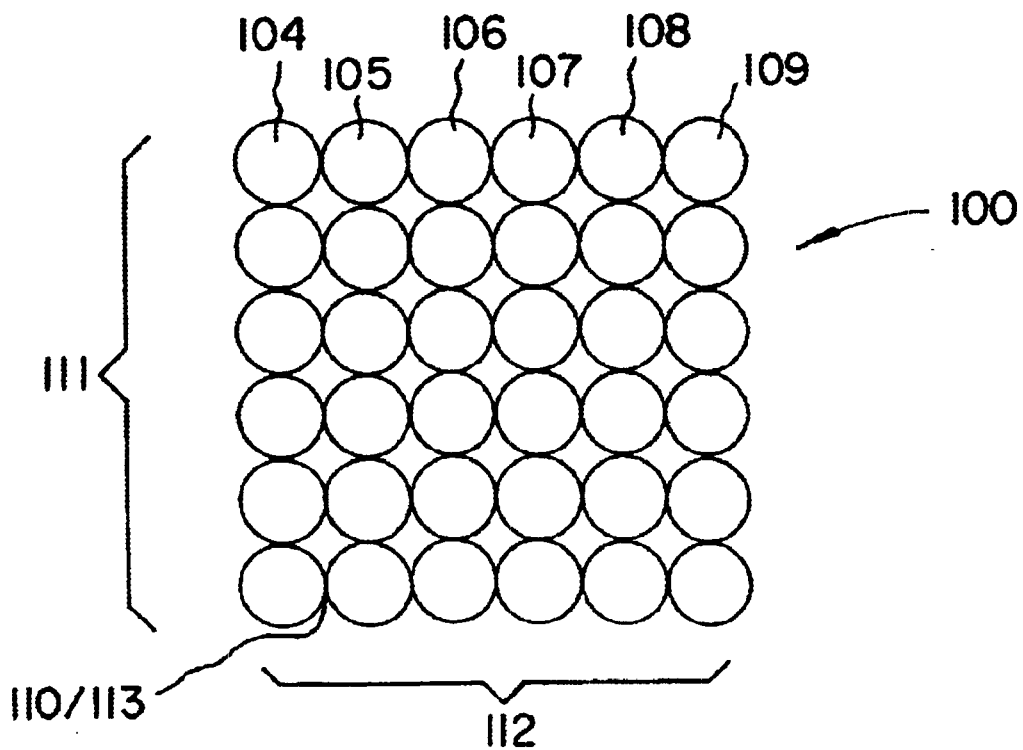
FIG. 6 is a schematic top plan view of yet still another solid immersion lens array made in accordance with the present invention.

FIG. 6 illustrates a top view of the embodiment of the solid immersion lens array 100 shown in FIGS. 5a and 5b. In this embodiment the solid immersion lens array 100 is formed by connecting adjacent SIL's 104, 105, 106, 107, 108, and 109 by the connecting member 110 or 113 described in FIGS. 7a and 7b respectively made in accordance with the present invention. As previously discussed in FIGS. 5a and 5b like numerals indicate like parts and operations. Multiple columns 111 and rows 112 of SIL 104 can be created using this technique. The number and spacing of the solid immersion lens 104 can be made to suit the type of sample, which is to be observed.

Figure 7:
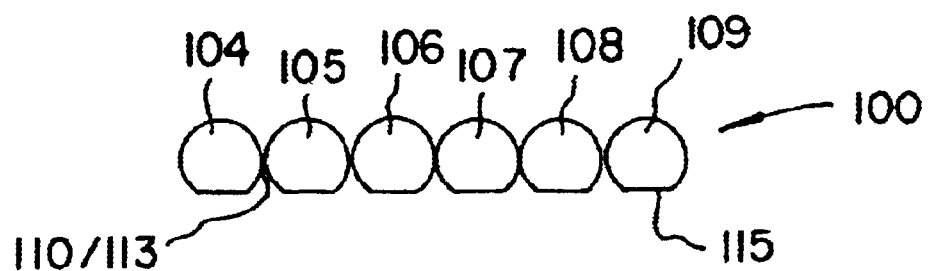
FIG. 7 is a schematic side view of a solid immersion lens array of FIG. 6.

FIG. 7 illustrates a side view of the embodiment of the solid immersion lens array 100 shown in FIG. 6.

Figure 8:
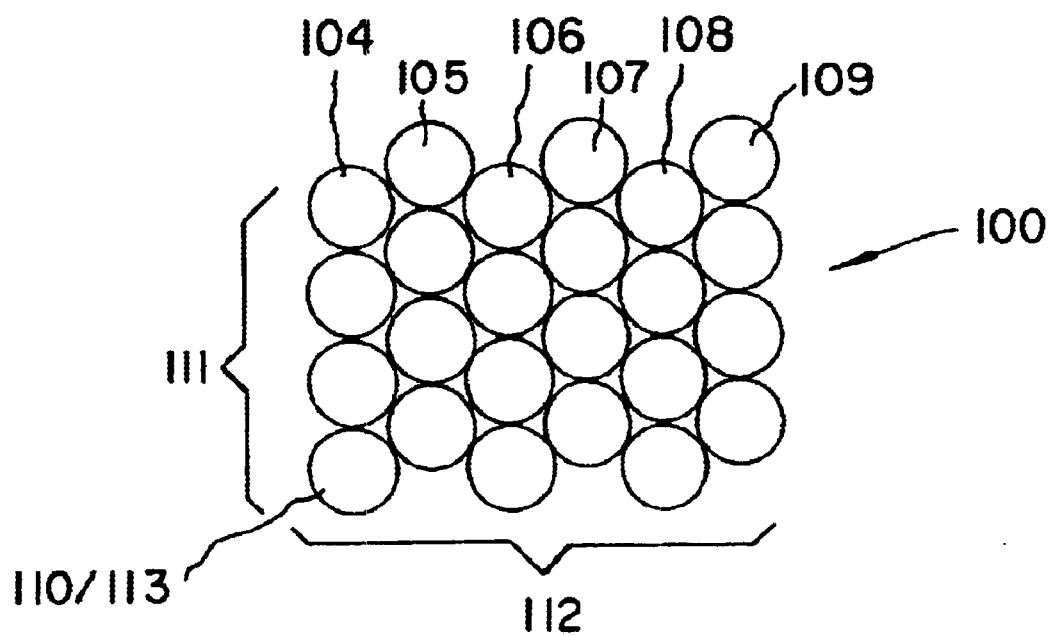
FIG. 8 is a schematic top plan view of another configuration of a solid immersion lens array made in accordance with the present invention.

FIG. 8 illustrates a top view of another configuration the solid immersion lens array 100 shown in FIG. 6 made in accordance with the present invention. As previously discussed in FIG. 6 like numerals indicate like parts and operations. Multiple columns 111 and rows 112 of SIL 104 can be created using this technique. The number and spacing of the solid immersion lens 104 can be made to suit the type of sample, which is to be observed. In this case, a close-packed array of spherical components is described.

Figure 9:
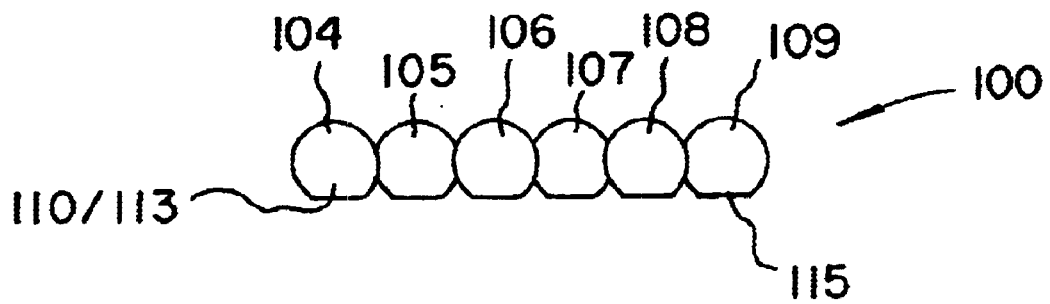
FIG. 9 is a schematic side view of a solid immersion lens array of FIG. 8.

FIG. 9 illustrates a side view of the solid immersion lens array 100 configuration shown in FIG. 8.

Figure 10:
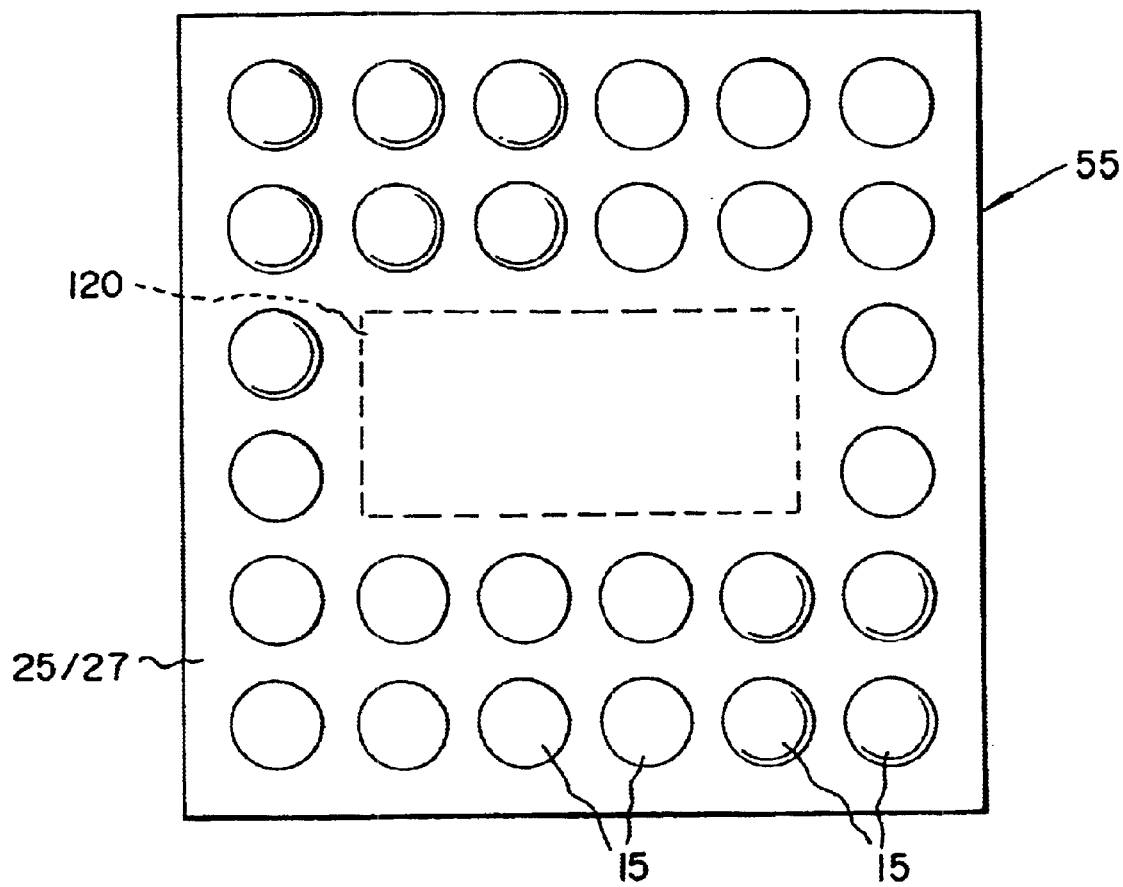
FIG. 10 is a schematic top plan view of a combination of a solid immersion lens array and a conventional cover slide made in accordance with the present invention.

FIG. 10 illustrates a top plan view of a combination of a solid immersion lens array 55 and a conventional cover slide 27 made in accordance with the present invention. As previously discussed in FIG. 2 like numerals indicate like parts and operations. The number and spacing of the solid immersion lens portion 15 can be made to suit the type of sample, which is to be observed. An open viewing area 120 is provided, which permits the user to observe the sample 37 (see FIG. 1) using the imaging device 60 such as a microscope under normal magnification or through the solid immersion lens portion 15 at increased spatial resolution.

Figure 11A:
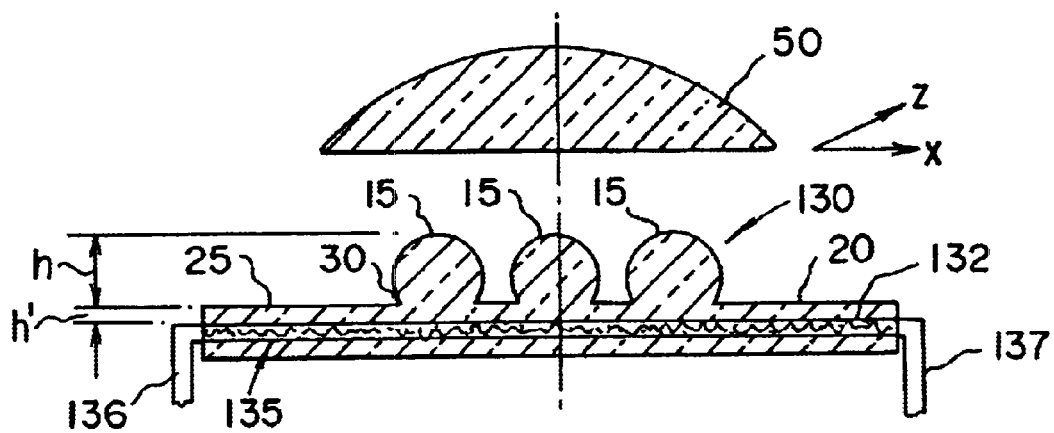
FIGS. 11a, 11b and 11c are schematic cross-sectional views of a solid immersion lens array of another embodiment of a solid immersion lens made in accordance with the present invention.
Figure 11B:
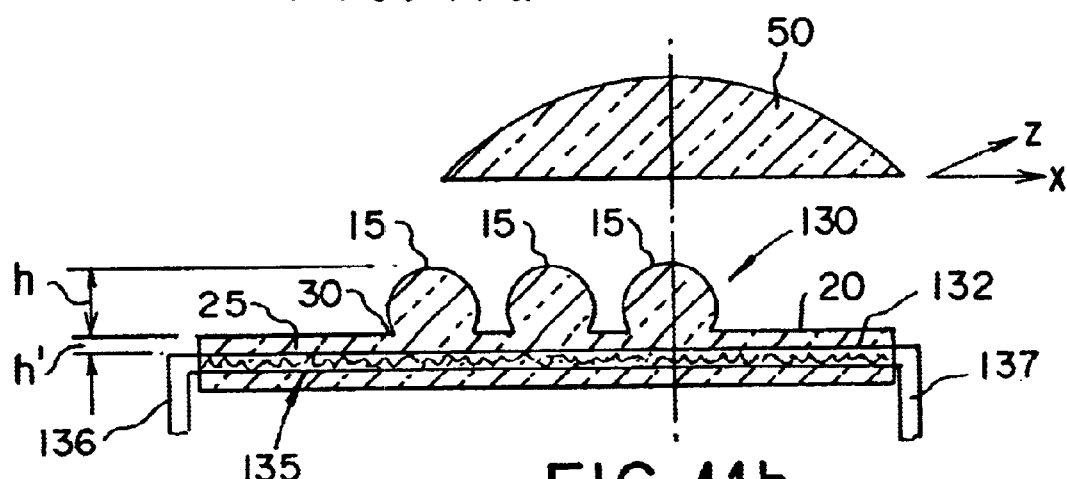
Figure 11C:
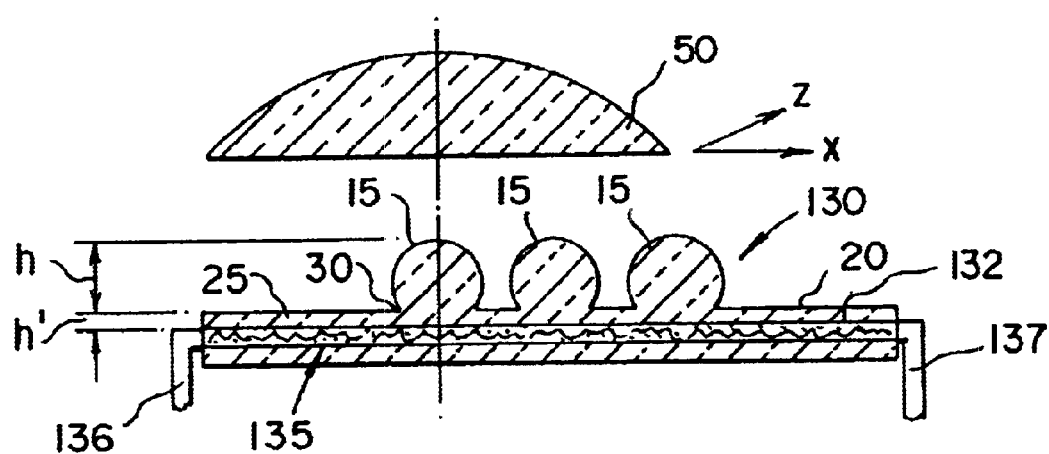
Figures 12A, 12B:
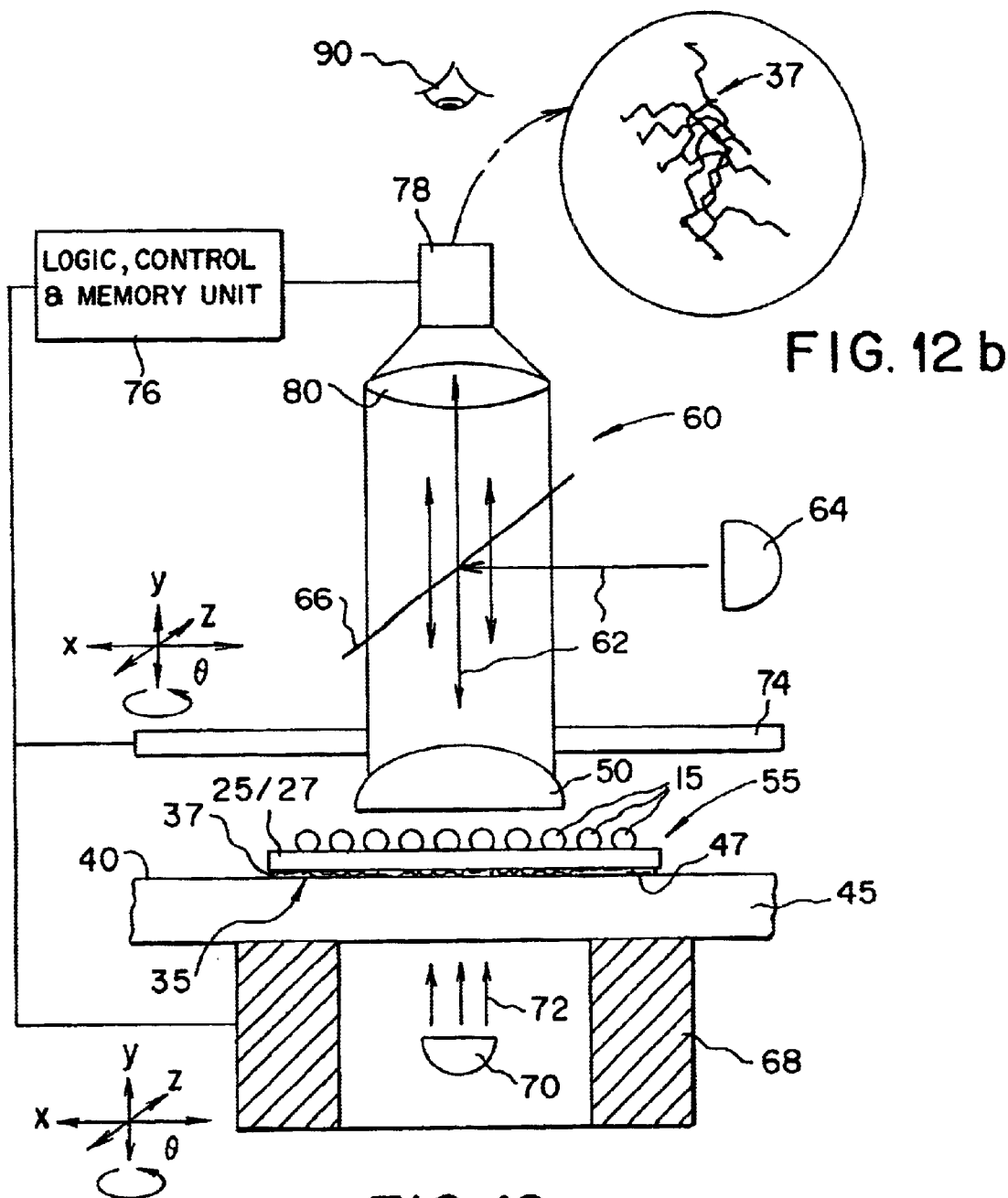
FIG. 12a is a schematic view of the eye piece/sensor of an apparatus that uses the SIL array of FIGS. 2–4.
FIG. 12b is an enlarged top plan view of the apparatus of FIG. 12a as indicated by the arrow showing the sample being viewed.

Referring to FIG. 11a, there is illustrated a cross-sectional view of a solid immersion lens array 130 made in accordance with the present invention. As previously discussed in FIG. 4a like numerals indicate like parts and operations. In the embodiment shown in FIG. 11a the solid immersion lens portions 15 are molded with the body portion 25. A channel 132 is formed as part of the body portion 25 and connected to a pumping mechanism (not shown) via tubes 136 and 137. The method for forming the channel 132 and for pumping a sample 135 through the channel 132 is described in U.S. Pat. No. 6,301,055. The solid immersion lens array 130 allows the user to move the magnifying imaging device 60 (see FIG. 12a) collecting/collimating lens 50 in an x and z direction to observe different locations along the channel 132 as shown in FIGS. 11b and 11c to observed different portions of the sample 135, which has been pumped into the channel 132. Referring now to FIG. 12a, the sample 37 can be viewed and an image captured using the solid immersion lens array 55 and a magnifying imaging device 60 such as a microscope. A light beam 62 from a light source 64 reflects from a beam splitter 66 and passes through the collecting/collimating lens 50 of conventional design and impinges onto the solid immersion lens portion 15 of the solid immersion lens array 55. Samples 37 to be observed are placed in the region 35 between the top surface 40 of the slide 45 and the bottom surface 47 of the body portion 25 of the solid immersion lens array 55 as is well known to those skilled in the art. The light beam 62 is reflected from the sample 37, passes through the solid immersion lens array 55, the lens 50, and the beam splitter 66, imaging the sample 37 onto a sensor/eye piece 78 by a lens system 80. The sensor 78 can be a CCD or similar type device. The slide 45 with the solid immersion lens array 55 is located on an x, y, z, and θ translation device 68. The x, y, z, and θ translation device 68 can also contain an additional light source 70 whose light beam 72 can be directed to illuminate the slide 45 and sample 37 from underneath. The collecting/collimating lens 50 is positioned in relation to the solid immersion lens array 55 by an x, y, z, and θ translation device 74. Both translation (positioning) devices 68 and 74 and sensor 78 are connected to and controlled by a logic, control and memory unit 76. The light source 72 can be used in place of or in addition to the light source 64. The light sources 64 and 72 can be chosen and filters (not shown) can be added to the light path to provide illumination of a specific wavelength. The light sources 64 and 72 can be lasers or other types of illumination such as UV, IR etc can be used, as appropriate for the type of lens material used.

Referring now to FIG. 12b, an enlarged partial view of the image of the sample 37 captured by the device 60 is shown. Using the imaging device 60, images of the sample 37 are displayed for viewing. In addition to observing the sample 37 via a sensor 78 and electronic display (not shown) the sample 37 can be viewed by the human eye 90 using a standard microscope eyepiece 85.

Figures 13A, 13B:
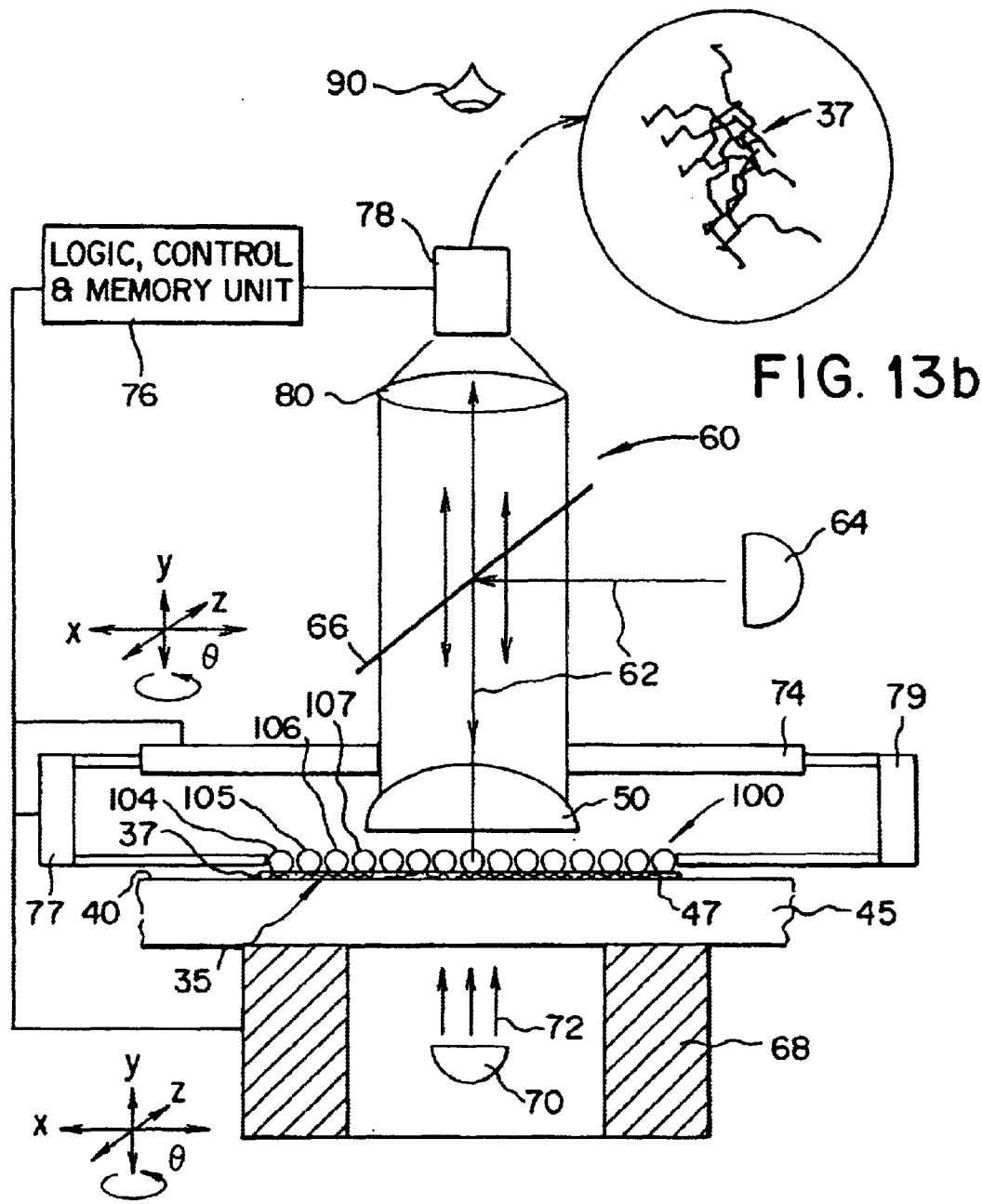
FIG. 13a is a schematic view of the eye piece/sensor of an apparatus of another embodiment of the present invention.
FIG. 13b is an enlarged top plan view of the apparatus of FIG. 13a as indicated by the arrow showing the sample being viewed.

FIG. 13a illustrates another embodiment of the present invention. The sample 37 can be viewed and an image captured using the solid immersion lens array 100 using a magnifying imaging device 60 such as a microscope. A light beam 62 from a light source 64 reflects from a beam splitter 66 and passes through the collecting/collimating lens 50 of conventional design and impinges onto the solid immersion lens portions 104, 105, 106, 107, 108 and 109 which represent several of the solid immersion lens portions of the solid immersion lens array 100. Samples 37 to be observed are placed between the top surface 40 of the slide 45 and the bottom surface 47 of the solid immersion lens portions 104, 105, 106, 107, 108 and 109 of the solid immersion lens array 100 as is well known to those skilled in the art. The light beam 62 is reflected from the sample 37, passes through the solid immersion lens array 100, the lens 50, and the beam splitter 66, imaging the sample 37 onto a sensor/eye piece 78 by a lens system 80. The slide 45 is located on an x, y, z, and θ translation (positioning) device 68. The x, y, z, and θ translation device 68 can also contain an additional light source 70 whose light beam 72 can be directed to illuminate the slide 45 and sample 37 from underneath. The collecting/collimating lens 50 and the solid immersion lens array 100 are positioned in relation to each other and to the slide 45 by an x, y, z, and θ translation devices 74, 77, 79 and x, y, z, and θ translation device 68. The translation devices 68, 74, 77 and 79 and sensor/eye piece 78 are connected to and controlled by a logic, control and memory unit 76. The light source 72 can be used in place of or in addition to the light source 64. The light sources 64 and 72 can be chosen and filters (not shown) can be added to the light path to provide illumination of a specific wavelength. Lasers or other types of illumination such as UV, IR etc can be used for the light sources 64 and 72. Again, the lens material must be appropriately transmissive for use in a particular region of the spectrum.

Referring now to FIG. 13b, an enlarged partial view of the image of the sample 37 captured by the device 60 is shown. Using the imaging device 60, images of the sample 37 are displayed for viewing. In addition to observing the sample 37 via a sensor/eye piece 78 and electronic display (not shown) the sample 37 can be viewed via the human eye 90.

It is to be understood that various changes and modifications made be made without departing from the scope of the present invention, the present invention being defined by the claims that follow.

PARTS LIST 10 solid immersion lens (SIL)
15 solid immersion lens portion
20 surface
25 body portion
27 cover slide
30 margin
35 observation region
37 sample
40 top surface
45 slide
47 bottom surface
50 collecting/collimating lens
55 solid immersion lens array
60 magnifying imaging device
62 light beam
64 light source
66 beam splitter
68 translation device
70 light source
72 light beam
74 translation device
76 logic, control and memory unit
77 translation device
78 sensor/eye piece
79 translation device
80 lens system
85 eyepiece
90 eye
100 solid immersion lens array(SIL)
101 sphere
102 sphere
104 solid immersion lens (SIL)
105 solid immersion lens (SIL)
106 solid immersion lens (SIL)
107 solid immersion lens (SIL)
108 solid immersion lens (SIL)
109 solid immersion lens (SIL)
110 connecting member
111 column
112 row
113 connecting member
115 flat surface
120 open viewing area
130 solid immersion lens array
132 channel
135 sample
136 tube
137 tube

What is claimed is:

1. A method of viewing a plurality of different sections of a stationary sample using a solid immersion lens array having a plurality of solid immersion lenses and an associated viewing device to be used with said solid immersion lens device, said plurality of a solid immersion lenses in said solid immersion device is provided in a fixed relationship to each other, comprising the steps of:

providing said solid immersion lens device with respect to a stationary sample and for viewing of said sample used in said associated viewing device; and causing relative movement between said viewing device and said solid immersion lens device so as to allow viewing of different portions of said samples through said viewing device.

2. A method according to claim 1 wherein said relative movement comprises movement of said viewing device with respect to said solid immersion lens device which is maintained in a stationary position.

3. A method according to claim 1 wherein said plurality of solid immersion lenses have an index of refraction equal to or greater than 1.49.

4. A method according to claim 1 wherein said plurality of solid immersion lenses have an index of refraction in the range of about 1.49 to about 1.85.

5. A method according to claim 1 wherein said plurality of solid immersion lenses are made of glass.

* * * * *